July 8, 1958   G. J. O'BRIEN   2,841,868
CAKE CUTTERS AND SERVERS
Filed Feb. 18, 1957
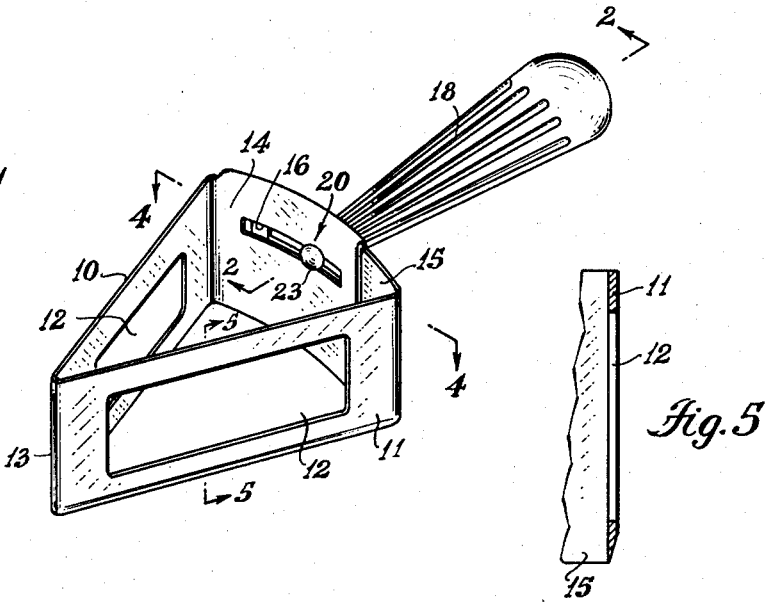
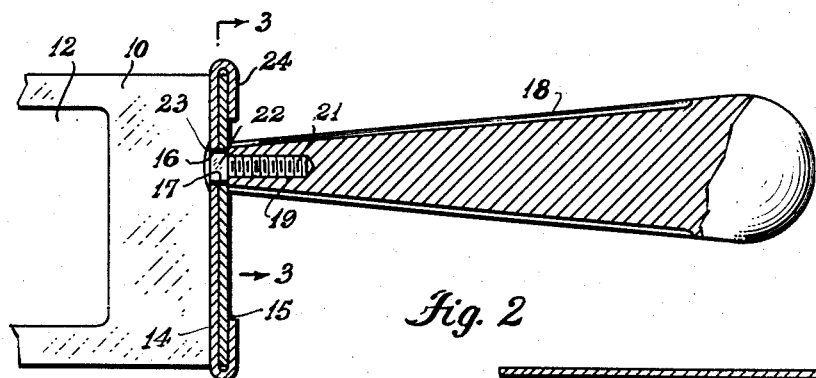
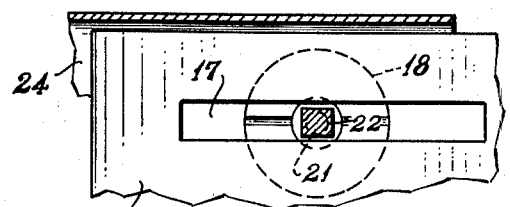
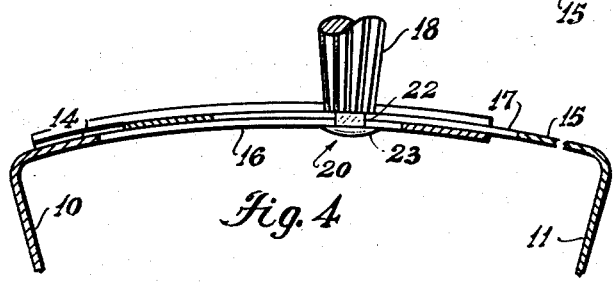
INVENTOR.
GERARD J. O'BRIEN
BY J. Ledermann
ATTORNEY

United States Patent Office 2,841,868
Patented July 8, 1958

2,841,868

CAKE CUTTERS AND SERVERS

Gerard J. O'Brien, Jersey City, N. J.

Application February 18, 1957, Serial No. 640,800

2 Claims. (Cl. 30—114)

This invention relates to cake cutters and servers adapted particularly for cutting a sector from a relatively tall cylindrical and soft cake such as, by way of example, a layer cake, and the main object of the invention is the provision of a new and improved cake cutter and server for not only cutting the sector from the cake but also for removing it to a plate without damaging or disfiguring the cut sector.

Another object of the invention is the provision of a cake cutter and server having means for readily varying the size or width of the cutter to cut a sector of the desired size or width.

Still another object of the invention is the provision of a cake cutter and server in the form of an isosceles triangle wherein the two equal sides constitute the cutter blades and the base of the triangle is formed of mutually overlapping and slidable extensions of the said two sides and the two sides and their extensions are all shaped out of a single length of sheet or sheet-like metal, a handle being attached to the said base and both the handle and the base being provided with means for releasably locking the said extensions together.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention to any or all of the exact details shown or described except insofar as they may be deemed essential to the invention.

Referring briefly to the drawing,

Fig. 1 is a perspective view of a cake cutter and server embodying the improvements of the present invention.

Fig. 2 is a sectional view taken on the line 2—2 of Fig. 1.

Fig. 3 is a sectional view taken on the line 3—3 of Fig. 2.

Fig. 4 is a sectional viiew taken on the line 4—4 of Fig. 1.

Fig. 5 is a sectional view taken on the line 5—5 of Fig. 1.

Referring in detail to the drawing, the numerals 10 and 11 indicate the two cutting blades of the implement, each having a substantially large rectangular cut-out or opening 12 therethrough and each forming one side of an angle whose apex is indicated at 13. The two blades 10 and 11 are formed of a continuous sheet or thin strip of unitary form which has been bent into angle shape at the apex 13. The material of the blades is preferably springy metal, such as steel.

At its rear end, that is, the end remote from the apex 13, the blade 10 has an extension 14 thereof having substantially the same height as the blade, the extension being arcuate in shape; and a substantially similar arcuate extension 15 is provided at the rear end of the blade 11, both extensions having a center of curvature lying in the apex 13, and each extending at an obtuse angle to its corresponding blade. The extensions 14 and 15 are thus slidable one over the other to vary the degree of the angle between the blades and hence also the area of the triangle enclosed by the blades and the mutually slidable extensions 14 and 15.

The extension 14 is provided with a longitudinal slot 16 and the extension 15 is provided with an aligned longitudinal slot 17. A handle 18 of any suitable form is provided for the implement, and the handle has a threaded axial opening 19.

A bolt 20 has a threaded stem 21 adapted to register in the opening or socket 19 of the handle. The bolt has a two-part head including a square portion or neck 22 and a relatively flat but rounded extremity or head portion 23. The bolt is passed through the aligned portions of the slots 16 and 17 in a rearward direction and the square neck 22 is registered within both slots, thus preventing rotation of the bolt, the head 23 providing a limit stop, and the handle is then screwed on to the threaded bolt stem 21. It is apparent that when the handle is tightened down the two extensions 14 and 15 are locked together. In order to vary the angular distance between the blades, the handle is unscrewed sufficiently to permit the two extensions to slide along each other to the desired position whence the handle is again screwed down. Thus the implement is readily adjustable to accommodate it to the desired size of cake sector to be cut. Since, after cutting the sector, the two blades remain in position on the sides of the sector, the latter may be carried in the implement to a plate without danger of damaging or disfiguring it.

In order that the two extensions may be restrained from separating from each other in a direction at right angles thereto, one of them, preferably the inner one 14, is provided at the top and bottom with a doubled back lip shown at 24, thus providing a restraining guide groove for the extension 15 in which the latter slides.

To release the cake sector on a plate, the handle is loosened to permit the normal resiliency of the unitary cutter member composed of the two blades 10 and 11 to expand, thus separating the blades from the sides of the sector. In order to minimize the possibility of cake sticking to the blades, the rectangular cut-outs 12 are provided therein.

I claim:

1. A cake cutter and server comprising a pair of blades of resilient material positioned at an acute angle to each other and formed of a unitary length of said material bent at the apex of said angle, the size of said acute angle being thereby adapted to be varied by swinging said blades apart or toward each other about said apex as a pivot, each of said blades having an extension thereon extending from the end thereof remote from said apex at an obtuse angle thereto in a direction toward the opposite blade, said extensions being arcuate at a curvature having the center thereof at the apex, said blades being positioned in mutual sliding contact, the radius of the curvature of said extensions being identical with the length of said blades, a handle, and cooperating means on said handle and on said extensions for releasably locking said extensions against mutual sliding.

2. A cake cutter and server according to claim 5, said means comprising a bolt having a neck portion square in outline and having a length equal to the combined thicknesses of said extensions, said extensions having aligned longitudinal slots, said bolt passing through said slots with said neck registering in the slots, said handle having a threaded axial socket, said bolt having a threaded stem on one end registering in said socket and having an enlargement on the other end engaging against the adjacent extension, said means thereby permitting release of said extensions to permit mutual sliding thereof by partial unscrewing of the handle from the stem.

References Cited in the file of this patent

UNITED STATES PATENTS

| | | |
|---|---|---|
| 1,425,260 | Ingelson | Aug. 8, 1922 |
| 1,796,847 | Leclerc | Mar. 17, 1931 |
| 1,920,954 | Benedict | Aug. 8, 1933 |
| 2,448,383 | Mathaus | Aug. 31, 1948 |
| 2,770,035 | O'Brien | Nov. 13, 1956 |